United States Patent [19]

Siciliano

[11] Patent Number: 4,489,675
[45] Date of Patent: Dec. 25, 1984

[54] SCRAPER ASSEMBLY

[75] Inventor: Anthony J. Siciliano, South Lyon, Mich.

[73] Assignee: Diamond Automations, Inc., Farmington, Mich.

[21] Appl. No.: 339,866

[22] Filed: Jan. 18, 1982

[51] Int. Cl.³ .................. A01K 31/04; B65G 25/04
[52] U.S. Cl. .................................. 119/22; 198/364; 198/748
[58] Field of Search .................. 119/18, 22, 28, 48; 198/364, 745, 747, 748

[56] References Cited

U.S. PATENT DOCUMENTS

| | | | |
|---|---|---|---|
| 2,264,939 | 12/1941 | Hawkins | 119/22 X |
| 2,970,567 | 2/1961 | Rubin | 119/22 |
| 3,033,348 | 5/1962 | Andrew | 198/82 |
| 3,318,441 | 5/1967 | Keen et al. | 198/175 |
| 3,768,443 | 10/1973 | Keen et al. | 119/22 |
| 3,783,829 | 1/1974 | Siciliano | 119/17 |
| 3,889,826 | 6/1975 | Pate | 198/745 X |

FOREIGN PATENT DOCUMENTS

| | | | |
|---|---|---|---|
| 2310389 | 9/1973 | Fed. Rep. of Germany | 119/28 |
| 1167253 | 10/1969 | United Kingdom | 198/745 |
| 725630 | 4/1980 | U.S.S.R. | 119/28 |

Primary Examiner—Robert P. Swiatek
Attorney, Agent, or Firm—Kenyon & Kenyon

[57] ABSTRACT

A manure scraper assembly for removal of manure from collecting sheets used in association with poultry cage systems. The scraper assembly includes a blade member which is angularly disposed with respect to the manure collecting sheets and which has the lower portion of each end thereof raised sufficiently to facilitate sliding across the overlapped edges of the manure collecting sheets. The scraper assembly is pivotally movable with respect to the manure collecting sheets so that the leading and trailing ends of the scraper blade are functionally interchanged when the direction of movement of the scraper assembly is reversed upon reaching the end of the length of manure collecting sheets.

10 Claims, 3 Drawing Figures

SCRAPER ASSEMBLY

BACKGROUND OF THE INVENTION

This invention relates generally to battery caged row arrangements such as utilized in raising poultry, and more particularly, to one wherein the cages are provided with manure shed elements and an associated cleaning system.

It is typical in large poultry houses to provide long rows of spaced and stacked cages for housing poultry, the cages being generally arranged with at least portions of the stacked cages overlapping the one disposed therebeneath, In such poultry cage row arrangements, it is advantageous to provide sheds or manure collecting means upon which the droppings from the upper rows of cages may be caught and dried. The prior art includes devices for removal of the manure, one such arrangement being as shown in my earlier U.S. Pat. No. 3,783,829 entitled "Manure Sheds and Joist Cleaner Arrangement". In my earlier patent, there is described a scraper assembly which is moved along the length of the manure collecting sheets in order to cause the manure to drop into a central pit disposed beneath the cages. The scraper assembly as described therein, is moved from one end of the poultry cage system to the other end at which time a reversing switch is activated to change the direction of the drive motor. In that arrangement, one of the scraper blades is operational and removes the manure while travelling in the one direction while another blade is operative while travelling in the other direction.

Thus, in the prior art it has been known to use a single drive unit attached at the end of a cage row to two scraper blades. By means of this prior art arrangement, one scraper is used to clean manure off the collecting board while the other scraper is inactive and deadheading back. At the point when the active cleaning scraper reaches the end of the row, the drive unit is reversed at which time the scraper which was cleaning previously is now deadheading back and the other scraper becomes the active cleaning scraper. By the means disclosed herein a single scraper assembly is used which can clean the manure off the collecting boards in both directions. Such a system is highly advantageous in that it reduces the energy required to drive the scraper assemblies by approximately fifty percent. With the cage rows being utilized in lengths of 400 to 500 feet, such a saving is substantial.

SUMMARY OF THE INVENTION

Briefly stated, the invention herein relates to a reversible scraper assembly for cleaning manure collecting sheets utilized in poultry cage systems and includes a scraper blade member disposed angularly with respect to the manure collecting sheets. The blade member is disposed at an angle so as to extend substantially across the effective width of the collecting sheet. Means are provided to facilitate movement of the scraper blade assembly along the length of the adjacently spaced manure collecting sheets. A reversing means is further provided to cause the direction of the scraper blade assembly moving means to be changed when the blade is at or adjacent to the end of the row of collecting sheets. Means are further provided for pivotally moving the scraper blade assembly with respect to the manure collecting sheets upon a reversal of the direction of the scraper blade moving means. The pivotally moving means is thus adapted to accomplish a reversal of the position of the leading and trailing edges of the angularly disposed scraper blade assembly.

More particularly, the invention herein when used in conjunction with adjacently spaced poultry cage rows is provided with a pull bar member disposed adjacent and between the inner edges of the inwardly inclined manure collecting sheets. The pull bar is driven by a reversible motor which is connected thereto by means of a wire cable. In this manner, the pull bar is moved parallel to and along the length of the manure collecting sheets with its direction being reversed upon reaching the end of the length of adjacently spaced sheets. The scraper blade assembly is provided with a blade member having the leading edge thereof extended sufficiently to clear the outer portion of the manure collecting sheet and the trailing edge extending inwardly toward the pull bar sufficiently to clear the inner portion of the manure collecting sheet. The pull bar and scraper blade members are connected by means of a coupling member which has one end thereof pivotally mounted with respect to the pull bar member and the other end thereof connected to the scraper blade member at the approximate center thereof. A receptacle, adapted to receive one end of the coupling member, is connected to the pull bar. The pull bar member operates in association with stop members positioned on a central frame member for limiting the slidable movement of the receptacle along its length. The pull bar thus functions in association with the frame assembly, the leading edge of which is used to activate a limiting switch which emits a signal to the reversible drive motor to provide a reversal thereof. The frame assembly further functions to limit the pivotal movement of the scraper blade assembly with one section functioning to engage and position the leading edge of the scraper blade assembly angularly with respect to the manure collecting sheets when the pull bar is moved in one direction. The frame member is further provided with another section for engaging and positioning the leading edge of the scraper blade assembly angularly with respect to the manure collecting sheets when the pull bar is moved in the other direction. Thus, a change in direction of the reversible drive motor causes the pull bar to move in association with the receptacle attached thereto. Movement of the receptacle, causes movement of the coupling member and results in pivoting the scraper blade member. Movement of the pull bar is limited by stop members provided on the frame assembly center bar while pivotal movement of the scraper blades is limited by an outer section of the frame assembly.

In the preferred embodiment, the scraper blade member has the lower portion of each end thereof raised, or bevelled, sufficiently to facilitate sliding of the blade member across the overlapped edges of the manure collecting sheets. In this manner, the provision of an inclined or a bevelled leading edge on the forward portion of the frame assembly as well as the scraper blade allows the scraper assembly to slide across the overlapped manure collecting sheets gently before the scraper blade actually comes into contact therewith.

Accordingly, it is an object of this invention to provide a scraper assembly for use in cleaning a length of manure collecting sheets.

It is another object of this invention to provide a manure scraper assembly which is adapted to clean the collecting sheets effectively while being moved in either direction along the length of the sheets.

It is still another object of this invention to provide a scraper assembly for cleaning manure collecting sheets in which the scraper assembly is adapted to change its orientation upon a change in direction of its movement.

These and other objects of this invention will become more apparent when taken in conjunction with the accompanying drawings.

BRIEF DESCRIPTION OF THE PREFERRED EMBODIMENT

Figure 1:
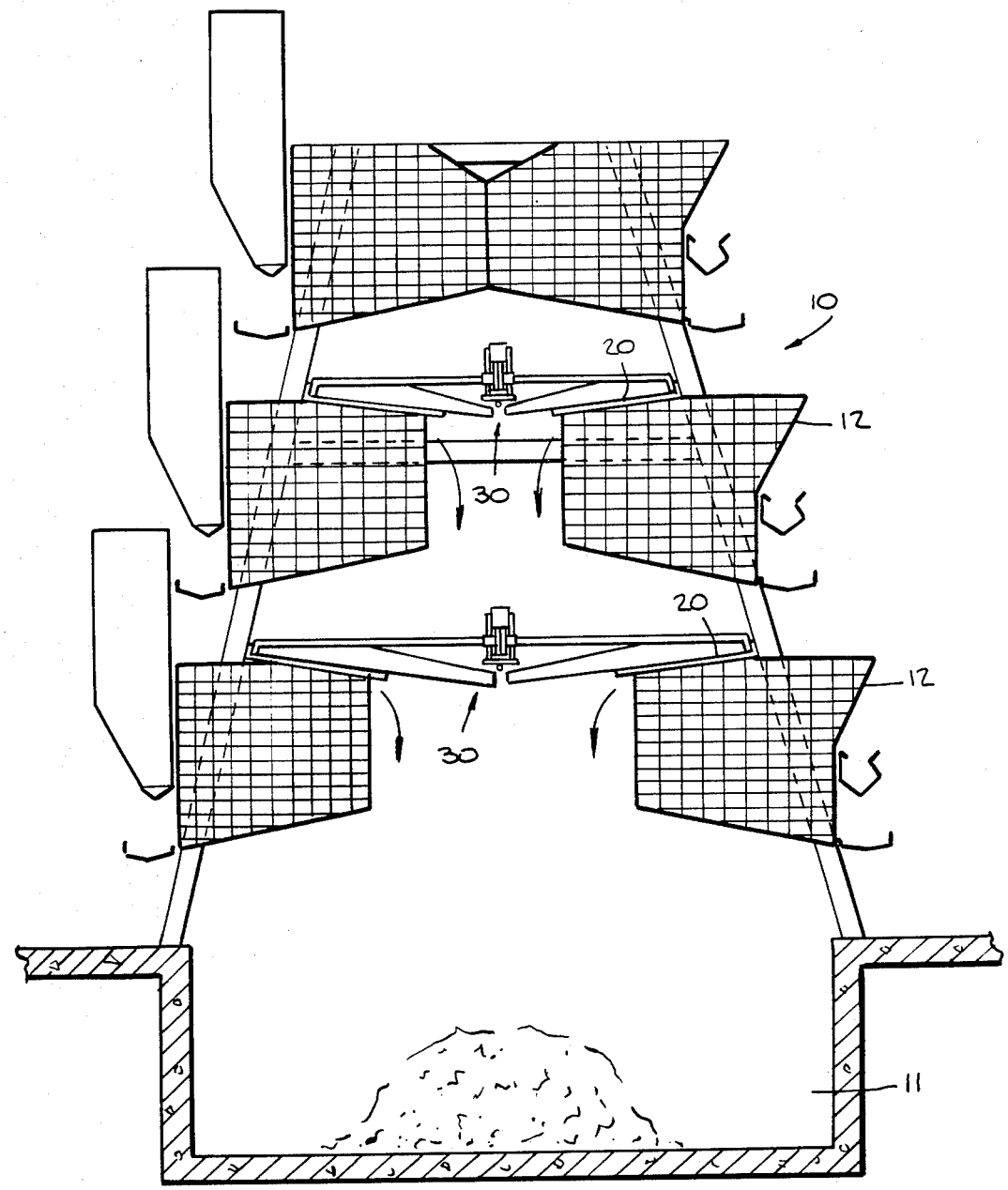
FIG. 1 is a side elevation view of a poultry cage system in which the rows of cages are stacked one over the other and which employs the scraper assembly of this invention.

With reference to the drawings, particularly FIG. 1, the poultry cage system 10 is positioned over an opening 11 in which the manure is accumulated. The individual cage members 12 are disposed above one another in an overlapping relationship. Thus, a manure collecting sheet 20 is provided over the inward section of the two lowermost rows of cages 12. Manure collecting sheets 20 are disposed for the entire length of the row of cages in an overlapping relationship so that no droppings fall between boards.

Figure 2:
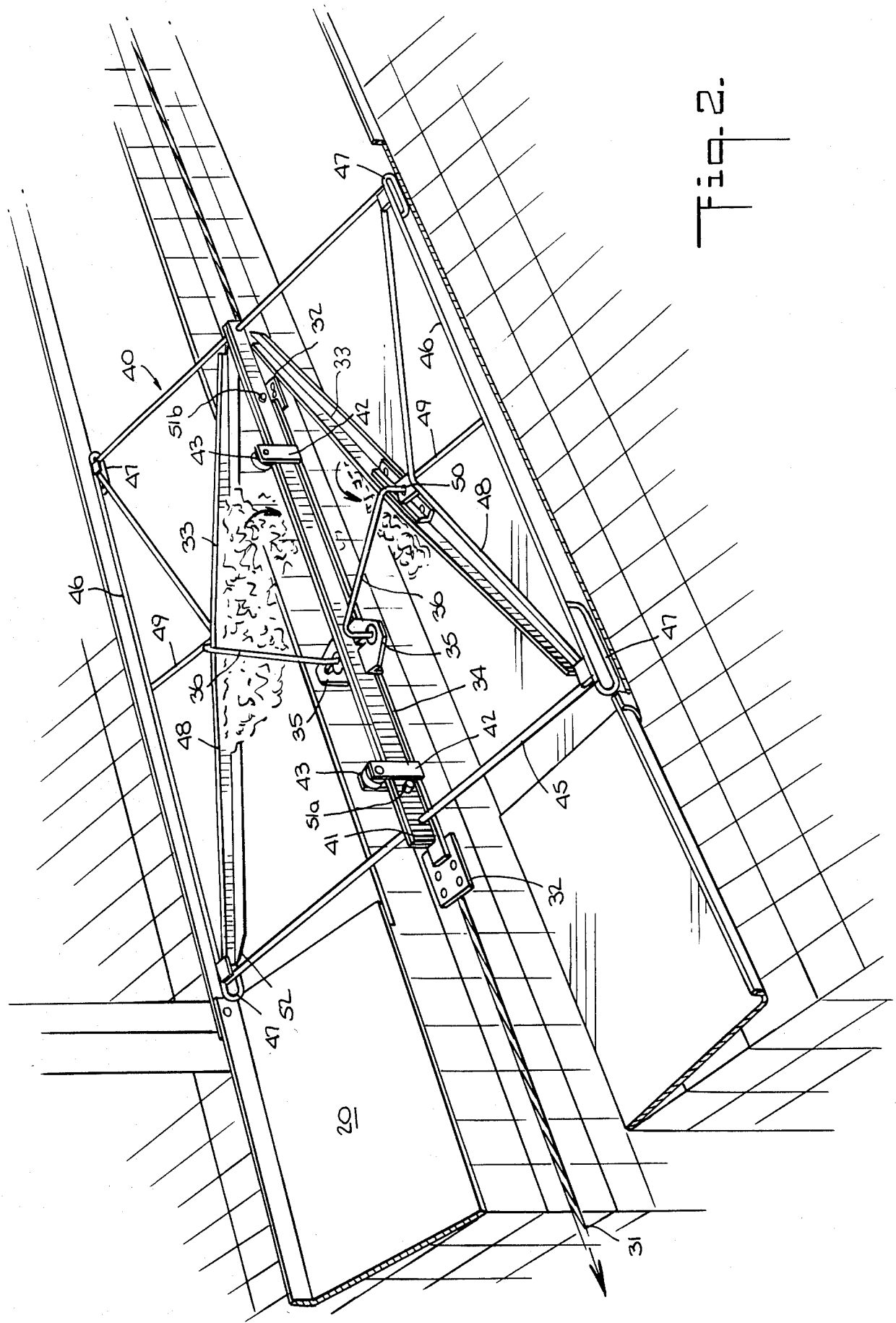
FIG. 2 is an enlarged perspective view of the scraper assembly of this invention being moved across manure collecting sheets in a right-to-left direction.
Figure 3:
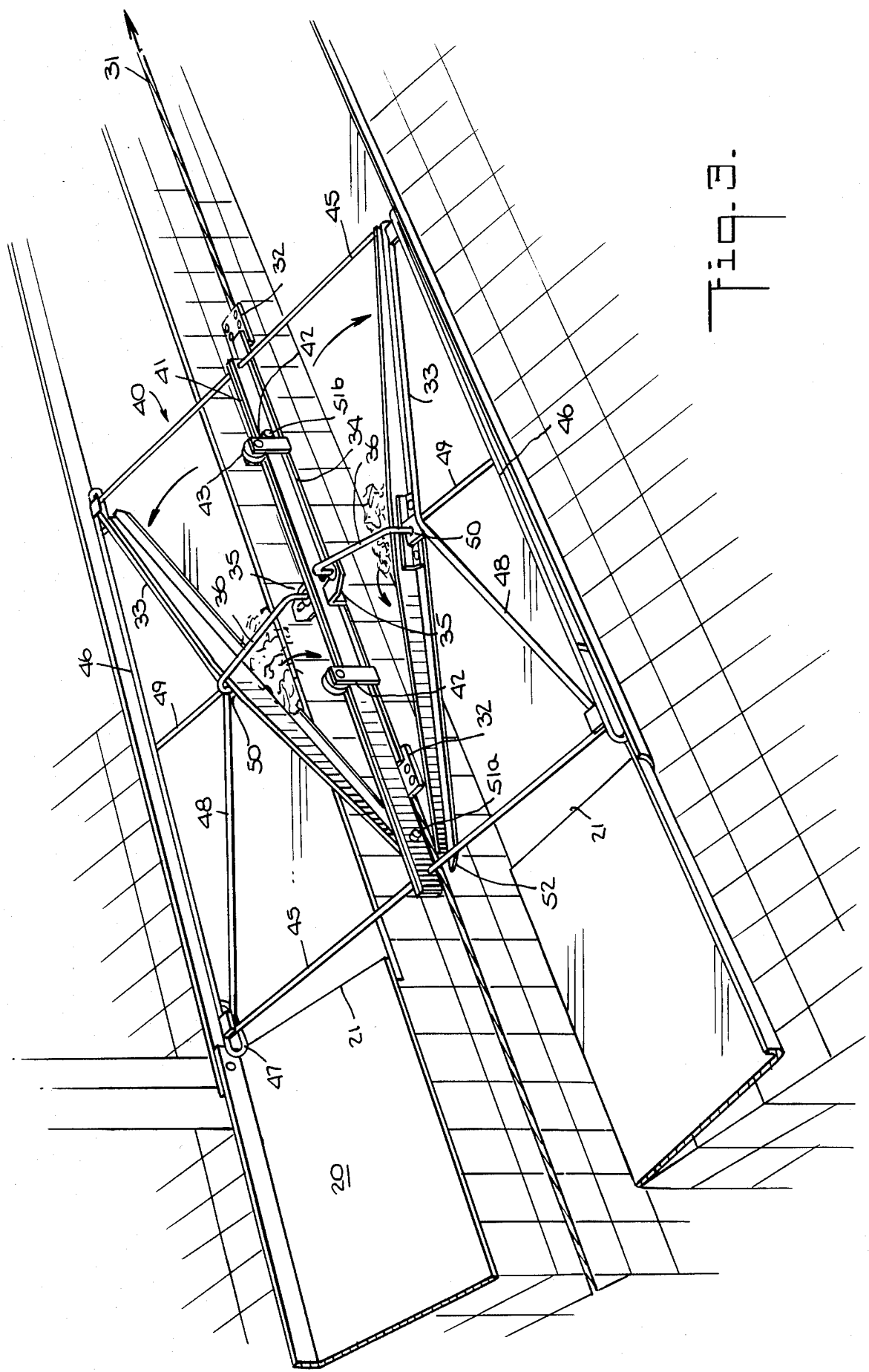
FIG. 3 is an enlarged perspective view of the scraper blade assembly in this invention being moved across manure collecting sheets in a left-to-right direction.

A scraper assembly 30 is provided for the two lowermost rows of cages. As shown in FIGS. 2 and 3, scraper assembly 30 is pulled across manure collecting sheets 20 by a reversible drive motor connected to the wire cable 31 by means of connector 32. Scraper blade members 33 are disposed in a mirror image relationship with respect to the centrally disposed wire cable 31. A pull bar 34 is interposed between the pair of wire cable connectors 32 and includes in the approximate center thereof a pair of oppositely disposed receptacle brackets 35. Each receptacle bracket 35 has pivotally mounted therein a coupling member 36 which has the other end thereof connected to the scraper blade 33.

Pull bar 34 is slidably mounted with respect to a frame assembly 40 which includes a center bar 41. In this regard, pull bar 34 includes a pair of upwardly extending supports 42 each of which is provided with a roller 43 in engagement with the upper surface of center bar 41. As part of frame assembly 40, rods 45 are provided at each end thereof and pass through the ends of center bar 41. Side rails 46 complete the outer frame assembly and include at the ends thereof raised or inclined portions 47 which facilitate sliding of the frame members over the overlapping edges 21 of the manure collecting boards 20, Extending from the corner intersections of the frame assembly 40 are V-shaped supports 48 which have the centers thereof connected to rails 46 by means of the rod 49. At the apex of each V-shaped support 48 is a receptacle 50 for receiving the other end of coupling 36 and pivoting scraper blade 33 with respect thereto. The aperture in receptacle 50 is slightly larger than the mating end of coupling 36 to allow movement of scraper blade 33 with respect to frame assembly 40. Thus, scraper blade 33 which is rigidly attached to coupling 36, moves up and down with respect to frame assembly 40 while being pivotally mounted in receptacle 50. The upward and downward movement of scraper blade 33 is advantageous when encountering large accumulations on the manure collecting sheets 20.

Central bar 41 of frame assembly 40, in addition, includes stops 51a and 51b disposed adjacent each end thereof. Also, each scraper blade member has the ends thereof upwardly inclined at 52 in a bevelled manner to facilitate the guiding of the scraper blade 33 across the overlapping edges 21 of the adjacently spaced manure collecting sheets.

In operation the reversible scraper assembly 30 of this invention is shown in FIG. 2 as being pulled along the manure collecting sheets 20 in a right to left direction by means of the motor driven wire cable 31. With scraper assembly 30 moving toward the left, scraper blade 33 is inclined with the leading edge being disposed adjacent the outer edge of manure collecting sheets 20 and the trailing edge adjacent pull bar 34. Pull bar 34 is extended to the furthest left position with respect to frame assembly 40 with upwardly extending support 42 bearing against stop 51a to provide the orientation of the scraper blade members as depicted in FIG. 2. Scraper blade members 33 are limited in their pivotal movement by the V-shaped support rail 48 which bears against and restrains the forward section of scraper blade 33.

When the scraper blade assembly and frame 40 are at the left end of the row of manure collecting sheets 20, a limit switch is engaged, preferably by forward bar 45 which causes a reversal of the drive motor. Thus, wire cable 31 is pulled in a left-to-right direction as depicted in FIG. 3. With this change in direction, pull bar 34 is moved toward the right with respect to frame assembly 40, and with upright support 42 engaging stop 51b to limit its movement. Movement of pull bar 34 toward the right causes coupling 36 to pivot each of the scraper blade members 33 so as to interchange the functions of the leading and trailing ends thereof. In other words, the scraper blades are pivotally rotated about the receptacle 50 in the direction of the arrows shown in FIG. 3. This pivotal movement of scraper blades 33 further cleans the manure collecting boards at the end of each row which presents a further advantage over the prior art. With the prior art scrapers, an accumulation of manure occurred at the end of each row when the direction of the scraper assemblies was reversed, all of which necessitated manual removal. With the pivotal scraper blade members 33, as the blades pivot any manure accumulation is scraped and swept into the pit below before starting a reversal of travel.

Thus, there has been described a manure scraper assembly which effectively cleans the manure boards while travelling in either direction and which utilizes a single scraper assembly with an accompanying saving in energy. Furthermore, employment of the scraper assemblies described herein eliminates the nonproductive deadheading of scraper assemblies as practiced in the prior art.

Although the above description is directed to a preferred embodiment of the invention, it is noted that other variations and modifications will be apparent to those skilled in the art and, therefore, may be made without departing from the spirit and scope of the present disclosure.

What is claimed is:

1. A reversible scraper system adapted to clean a manure collecting sheet utilized in battery cage row arrangements for raising poultry which comprises:

a pull bar member disposed adjacent the inner edge of the manure collecting sheet;

drive means operatively coupled to said pull bar member for moving said pull bar member parallel to and along a length of said manure collecting sheet;

means for reversing said pull bar drive means upon moving the length of said manure collecting sheet;

a scraper blade member disposed angularly with respect to said manure collecting sheet having a leading end portion thereof extended sufficiently to clear an outer portion of said manure collecting sheet and a trailing end portion extending inwardly toward said pull bar member sufficiently to clear an inner portion of said manure collecting sheet, the scraper blade member further having a scraper face always facing substantially toward said pull bar member and slidably moving along the manure collecting sheet in response to said drive means, and a trailing face always facing away from said pull bar member; and coupling means for coupling said pull bar member and scraper blade member to facilitate reversing the position of said leading and trailing end portions of said angularly disposed scraper blade member, said coupling means engaging with said scraper blade member at a pivot point disposed essentially midway between said leading and trailing end portions and at a predetermined lateral distance from said pull bar member.

2. The reversible scraper system of claim 1 wherein said coupling means includes a coupling member having one end thereof pivotally mounted with respect to said pull bar member and the other end thereof connected to said scraper blade member at said pivot point thereof, and a receptacle disposed on said pull bar member having means therein for receiving said one end of said coupling member whereby movement of said receptacle with respect to said scraper blade member causes a pivotal movement of said scraper blade member about said pivot point.

3. The reversible scraper system of claim 2 which further includes a frame assembly having stop members disposed thereon for limiting a slidable movement of said pull bar member and said receptacle with respect thereof.

4. The reversible scraper system of claim 3 wherein said frame assembly includes a frame member for limiting said pivotal movement of said scraper blade member, said frame member including a portion thereof for engaging and positioning said leading end portion of said scraper blade member angularly with respect to said manure collecting sheet when said pull bar member is moved in one direction and another portion thereof for engaging and positioning said leading end portion of said scraper blade member angularly with respect to said manure collecting sheet when said pull bar member is moved in the other direction.

5. The reversible scraper system of claim 1 wherein said scraper blade member has the lower portion of each end thereof raised sufficiently to facilitate sliding of said blade member across the inward edge of said manure collecting sheet.

6. The reversible scraper system of claim 1 which further includes a second scraper blade member disposed angularly with respect to a second manure collecting sheet positioned on the other side of said pull bar member from said manure collecting sheet, said second scraper blade member having a leading end portion thereof extended sufficiently to clear an outer portion of said second manure collecting sheet and a trailing end portion extending inwardly toward said pull bar sufficiently to clear an inner portion of said second manure collecting sheet, and further coupling means for coupling said pull bar member and second scraper blade member to facilitate reversing the position of said leading and trailing end portions of said angularly disposed second scraper blade member.

7. A reversible scraper assembly for cleaning manure collecting sheets utilized in poultry cages which comprises:

a scraper blade assembly having trailing and leading end portions, the scraper blade assembly being disposed angularly with respect to the manure collecting sheets and extending substantially across an effective width of the manure collecting sheets;

moving means for moving said scraper blade assembly along a length of the manure collecting sheets, said moving means further including a pull bar member disposed adjacent to an inner edge of the manure collecting sheets;

reversing means for reversing the direction of said moving means; and pivotally moving means for pivotally moving said scraper blade assembly with respect to the manure collecting sheets upon reversing the direction of said moving means, said pivotally moving means being adapted to facilitate reversing the position of said leading and trailing end portions of said angularly disposed scraper blade assembly, said pivotally moving means further including a coupling member having one end thereof pivotally mounted with respect to said pull bar member and the other end thereof connected to said scraper blade assembly at the approximate center thereof, and a receptacle disposed on said pull bar member having means therein for receiving said one end of said coupling member whereby movement of said receptacle with respect to said scraper blade assembly causes a pivotal movement of said scraper blade assembly.

8. The reversible scraper assembly of claim 7 which further includes a frame assembly having stop members disposed thereon for limiting a slidable movement of said pull bar and receptacle with respect thereof and a frame member for limiting said pivotal movement of said scraper blade assembly, said frame member including a portion thereof for engaging and positioning said leading end portion of said scraper blade assembly angularly with respect to the manure collecting sheets when said pull bar is moved in one direction and another portion thereof for engaging and positioning said leading end portion of said scraper blade assembly angularly with respect to the manure collecting sheets when said pull bar is moved in the other direction.

9. The reversible scraper assembly of claim 7 wherein said scraper blade assembly has an extended-most portion of each of said leading and trailing end portions bevelled away from the manure collecting sheets to facilitate sliding of said scraper blade assembly across inward edges of the manure collecting sheets.

10. The reversible scraper assembly of claim 7 wherein said frame assembly includes a receptacle having an aperture therein for receiving said other end of said coupling member, said aperture being of a diameter greater than that of said coupling member thereby allowing upward and downward movement of said scraper assembly with respect thereto.

* * * * *